RADIO DIRECTION FINDER RECEIVER

Filed May 16, 1961

INVENTOR
PAUL G. HANSEL
BY Roy C. Hopgood
ATTORNEY

United States Patent Office 3,104,391

Patented Sept. 17, 1963

3,104,391

RADIO DIRECTION FINDER RECEIVER

Paul G. Hansel, Greenvale, N.Y., assignor to Servo Corporation of America, Hicksville, N.Y., a corporation of New York Filed May 16, 1961, Ser. No. 110,374
12 Claims. (Cl. 343—113)

This invention relates in general to FM radio receivers and in particular to Doppler-effect radio direction finder receivers which are adapted to produce an ouput signal indicating the bearing of an unknown source of RF radiation. The invention is characterized by a novel coherent FM detector system which is super-selective in frequency response, i.e. capable of distinguishing a desired input signal from a group of interfering signals which are all within the normal band pass of the receiver.

In Doppler-effect radio direction finder receivers, bearings are obtained from incoming signals by impressing a direction-dependent frequency modulation on the incoming signals in the receiver antenna system. This is done by rotating the receiver antenna at some predetermined scanning rate, whereby any fixed frequency input signal will be frequently modulated in accordance with the well known Doppler effect. When the antenna is too large to be rotated physically, the same result is obtained by switching the receiver input in rapid succession around a ring of fixed position antennas, which produces the same modulation by a quasi-Doppler effect.

The modulation envelope of this Doppler-induced FM signal is a sine wave whose frequency is equal to the antenna's actual or virtual revolution rate and whose phase angle varies in accordance with the bearing of the RF source. This phase angle is measured with respect to a reference signal that is developed in an alternator driven by the motor which rotates the antenna. The reference signal is equal in frequency to the modulation envelope of the FM signal, but its phase angle is fixed with respect to some physical reference line such as true north or the like. Therefore the bearing of the remote RF source can be determined by detecting and filtering the Doppler-induced FM signal and measuring the phase difference between its modulation envelope and the reference signal.

A discussion of the general problems associated with these prior art Doppler effect RDF receivers can be found in my U.S. Patent #2,481,509, which issued on September 13, 1949, for a "Directional System." Further discussions of the FM detector problems can be found in my U.S. Patent #2,490,050, which issued on November 6, 1949, for "Navigation System," and in my paper entitled "Doppler-Effect Omnirange," which was published in the Proceedings of the I.R.E., volume 41, Number 12, December 1953. The latter two publications describe a Doppler-effect navigation system rather than a Doppler-effect direction finder, but the FM detector problems are substantially the same in both devices. One problem arises from the fact that the Doppler-induced frequency variations, which carry the directional information, are smaller than the FM noise and frequency drift that are normally present in an RF transmission system. In the prior art receivers, this problem was partially solved with deviation expander and non-coherent FM detector circuits, i.e. circuits in which the detection process is independent of the phase angle of the incoming signal.

In accordance with this invention, however, it has been found that the overall system sensitivity and the system accuracy can be increased by means of coherent detection. Therefore, in one mode of operation, this invention provides a coherent FM detector comprising a conventional phase-locked oscillator loop which contains an oscillator, a phase detector, a low-pass filter, and a reactance transducer. The oscillator output is compared to the Doppler FM signal in the phase detector, which develops an output signal proportional to the phase difference between its two input signals. This phase-difference signal is applied through the low-pass filter to the reactance transducer, which changes the oscillator's frequency to bring it into phase with the Doppler FM signal. Thus the oscillator follows the frequency variations of the FM signal, whose modulation envelope is detected by virtue of the small time lag between input frequency variations and the corresponding adjustments of the oscillator frequency.

In a second mode of operation this phase-locked loop is modified to provide both coherent detection and superselection. Instead of detecting the FM signal directly it generates a synthetic carrier signal which is locked in phase quadrature to the center frequency of the Doppler FM signal. This change is accomplished by increasing the time constant of the loop so that the oscillator responds to the integral of the modulation envelope rather than to the modulation envelope itself. Therefore, instead of following the frequency variations of the input signal the oscillator follows the average of those variations.

The synthetic carrier is used in a novel coherent detector which increases selectivity so that a selected input signal can be separated from a group of interfering signals, all of which are within the receiver's input bandwidth. The synthetic carrier is locked in phase quadrature to the center frequency of the selected input signal and is then mixed with all of the incoming signals. This transforms the frequency variations of the selected input signal into amplitude variations which can be detected in an amplitude modulation detector. The transformation, however, is dependent on the quadrature phase relation, so the interfering signals, which are incoherent in phase with respect to the synthetic carrier, do not get translated into amplitude modulation. And since the AM detector does not respond to frequency variations, this means that the interfering signals will be rejected in the AM detector.

Accordingly, one principal object of this invention is to provide a Doppler effect RDF, receiver having improved sensitivity, accuracy and selectivity.

Another object of this invention is to provide a novel coherent FM detector having a higher selectivity than heretofore known in the art.

A further object of this invention is to provide a novel FM detector utilizing a synthetic carrier signal that is locked in phase quadrature to the center frequency of a selected FM input signal.

Other objects and advantages of the invention will be apparent to those skilled in the art from the following description of one illustrative example thereof, along with the attached drawings, in which.

Figures 1, 2, 3:
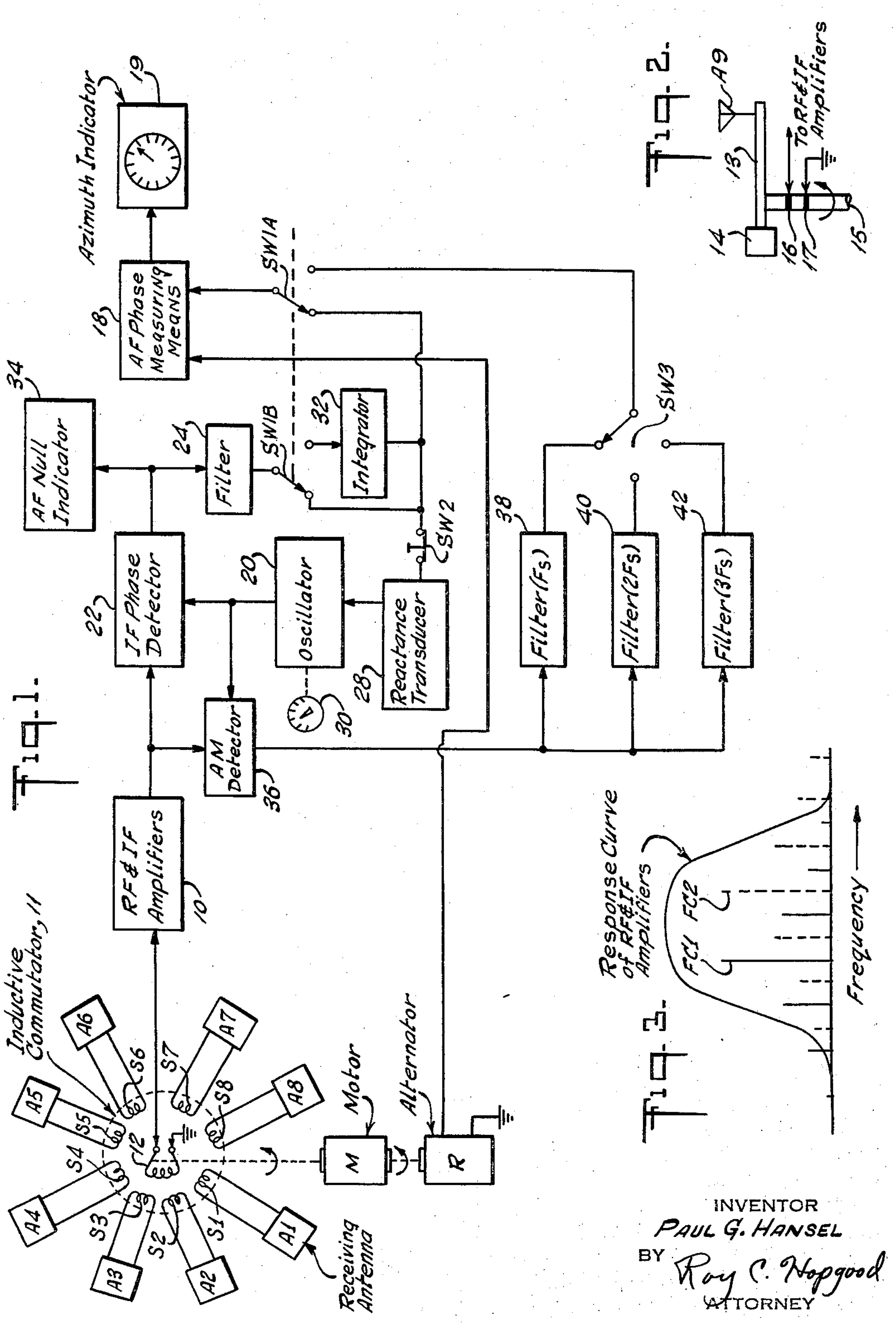
FIG. 1 is a block diagram of one embodiment of the invention.
FIG. 2 shows an alternate antenna structure for the embodiment of FIG. 1.
FIG. 3 is a graph showing the center frequencies and side-bands of two Doppler FM signals which are both within the input band-width of the embodiment shown in FIG. 1.

FIG. 1 shows one embodiment of the invention which utilizes a ring of fixed receiving antennas A1 . . . A8 which are coupled in sequence to RF and IF amplifiers 10 through an inductive commutator 11 which is driven at a pre-determined scanning speed by a motor M. Inductive commutator 11 contains a plurality of stator windings S1 . . . S8, each coupled to a corresponding antenna, and a rotor winding 12 that is coupled to RF and IF amplifiers 10 through slip rings which are indicated in the drawings by the arrows abutting against the terminals of rotor winding 12. As winding 12 is rotated by motor M it moves from one stator winding to the next, the stator windings being so placed as to insure a smooth transition between windings to minimize chopping of the input signal. Thus as rotor winding 12 is rotated the input to RF and IF amplifiers 10 is smoothly switched from one antenna to the next, and since the antennas are located in a circle this gives rise to aquasi Doppler effect which induces frequency variations in any fixed-frequency signal received by the antennas.

It will be understood by those skilled in the art that this commutated antenna array is the full equivalent of a physically rotatable antenna, such as shown in FIG. 2, in which a single antenna A9 is whirled in a circular path on a rotating boom 13 whose length is equal to the radius of the circle defined by antennas A1 . . . A8 and whose rotary speed is equal to the rotary speed of rotor winding 12. Boom 13, of course, is preferably fitted with a counterweight 14 to balance the structure, and it is spun by a rotating drive shaft 15 which can be coupled to any suitable motor. The connections to antenna A9 are made via slip rings 16 and 17, which make contact with brushes as indicated by the arrows abutting against the slip rings in FIG. 2. In some applications of the invention it will be preferable to use this physically rotatable antenna, but in other cases it will be desirable to use the commutated antenna array. The factors which enter into this selection, however, are well known to those skilled in the art, and since these two antenna systems produce the same electrical results in the input signals the same receiver circuits can be used in either case.

Motor M also drives an alternator R which produces a sine wave reference signal which is equal in frequency to modulation envelope of the Doppler (or quasi Doppler) induced frequency variations. The phase of the reference signal, however, is fixed with respect to a physical angular position of alternator R, and the mechanical coupling between motor M, alternator R, and inductive commutator 11 are adjusted to align this angular position with some geographical reference line such as true north or the like. Thus the phase of the reference signal corresponds to the phase of the FM signals which would be imposed on a fixed-frequency signal originating from a source located on the geographical reference line. Therefore the phase difference between the reference signal and the modulation envelope imposed on an input signal will uniquely define the bearing of the input signal source with respect to the geographical reference line.

The Doppler induced frequency variations imposed on the incoming signals are detected and filtered in an FM detector circuit, to be described later, and the modulation envelope thereof is compared to the reference signal in an audio frequency phase detector 18, which produces an output signal proportional to the phase difference between its two input signals. This output signal is applied to an azimuth indicator 19, which indicates the bearing of the input signal source with respect to the geographical reference line. As thus far described, this embodiment of the invention does not differ from the prior art Doppler-effect RDF receivers, and any suitable prior art circuits or devices can be used to embody the above described structural elements.

The inventive portion of FIG. 1 resides in the FM detector circuit. More specifically, the invention comprises a novel FM detector which is operable in two modes of operation; a first mode which provides coherent detection but not super-selectivity, and a second mode which provides both coherent detection and super-selectivity. In the first mode of operation, which is selected by throwing a double-pole double-throw switch SW–1 to the position shown in FIG. 1, the FM detector of this embodiment comprises a phase-locked oscillator loop containing an oscillator 20, an IF phase detector 22, a low pass filter 24, and a reactance transducer 28. Oscillator 20 is manually turned by a frequency control 30 to resonate close to the intermediate frequency output of RF and IF amplifiers 10. The output of oscillator 20 is applied to the phase detector 22, which also receives the incoming FM signal from RF and IF amplifiers 10 and develops a phase difference signal that is a function of the cosine of the phase angle between these two signals. This phase difference signal is applied through filter 24 to reactance transducer 28, which is coupled to the resonant circuit of oscillator 20. The phase-difference signal changes the reactance of transducer 28 in such a way as to bring oscillator 20 into phase with the incoming signal. The time constants of filter 24 and the other loop components are made short enough to hold oscillator 20 within a few degrees of the incoming signal so that phase detector 22 will operate in an approximately linear region of its cosine response curve. Under these conditions, the modulation envelope of the incoming signal will be detected in phase detector 22 and filtered in low-pass filter 24, which blocks frequencies higher than the modulation envelope frequency. The demodulated output signal is then applied through switch SW–1A to audio frequency phase detector 18, where it is compared to the reference signal from alternator R. In this first mode of operation the phase-locked oscillator loop is identical in function to prior art FM detectors of the same type, and any suitable prior art circuits can be used to mechanize elements 20 through 30.

In the second mode of operation, which is selected by throwing switches SW–1A and SW–1B to the other of their two positions, an entirely different principle of FM detection is employed. This principle is based on the fact that the side-bands of the FM signal are in phase quadrature to their center frequency, and that the FM envelope will be converted to AM if the FM signal is mixed with a large signal which is equal in frequency to the FM center frequency and cophasal with the FM side-bands. Since this conversion of FM to AM is dependent on a quadrature phase relation, it can be used to separate signals which are very close together in frequency, such as those shown, for example, in FIG. 3.

FIG. 3 shows an extreme case where two FM signals are so close together that their first order sidebands overlap. The solid lines indicate the center frequency FC1 and side-bands of one FM signal, and the dotted lines indicate the center frequency FC2 and side-bands of the other signal. Both signals are well within the input frequency response curve of the RF and IF amplifiers, and are approximately equal in amplitude. In the prior art FM detectors it would be difficult if not impossible to separate signals which are so close together, but in accordance with this invention the separation can be achieved quite easily by taking advantage of the fact that the two signals, which are generated in different transmitters, are incoherent in phase relation to each other. Therefore, if a synthetic carrier can be generated which is locked in phase quadrature to one of the center frequencies, then the signals can be separated by mixing the synthetic carrier with both signals and applying the mixture to an AM detector. The frequency variations of the selected signal will be converted into amplitude variations, which will be detected in the AM detector while the frequency variations of the other signal, which is incoherent with respect to the synthetic carrier, would remain as FM and would be rejected by the AM detector.

In this embodiment of the invention, the synthetic carrier signal is generated in the phase locked oscillator loop by increasing the loop time constant so that oscillator 20 responds to the integral of the modulation envelope rather than to the modulation envelope itself. This is done by adding an integrator 32 in series with the phase locked loop to integrate the modulation signals passed through filter 24. Since the integral of the modulation envelope is equal to the center frequency, oscillator 20 will then be locked in frequency to the center frequency of the incoming signal. And since phase detector 22 responds to the cosine of the phase difference between its two input signals, oscillator 20 will be locked in phase quadrature with the incoming center frequency.

The phase-locked oscillator loop is manually tuned to the selected center frequency by opening switch SW–2 and turning frequency control 30 for a zero beat indication on audio frequency null indicator 34, which can be a simple audio amplifier having an output indication meter. The center frequency can be distinguished from its side-bands on the basis of amplitude, and it can be distinguished from the other center frequency by vernier frequency calibrations on frequency control 30, or by simultaneous display of the signal frequencies and the oscillator frequency on an oscilloscope display. After oscillator 20 has been manually tuned to the desired center frequency, switch SW–2 is closed, and the feedback loop holds oscillator 20 locked in phase quadrature to the desired center frequency to within a few degrees of phase angle.

The synthetic carrier thus generated is applied to an AM detector 36, which also receives the output of RF and IF amplifiers 10. It should be noted at this point that the signal from amplifiers 10 should not be limited before being applied to AM detector 36 because limiters exhibit a capture effect, i.e., they follow the strangest input signal at the expense of the others. This would separate the input signals on the basis of their amplitude, and in cases where the selected signal is lower in amplitude than the interfering signal, it would render the detector inoperable. Therefore, any AM noise or voice modulation should be separated from the FM azimuth signal after the mixing has taken place rather than before. This can be done quite simply by filtering the output of AM detector 36 as described below.

The synthetic carrier signal can be mixed with the IF signals in a diode AM detector, or a triode AM detector, if desired, but it is preferable to mix the two signals in a product detector or in a quadrature grid detector such as a 6DT6 pentode. When a product detector or quadrature grid detector tube is used, the IF signal is applied to one RF input terminal thereof and the synthetic carrier to the other RF input terminal thereof. The output current of the product detector or quadrature grid detector will contain an audio frequency signal that follows the FM envelope of the selected FM input signal, and this audio frequency signal is separated from AM noise or voice modulation in filters 38, 40 or 42. The filters are sharply tuned respectively to the fundamental frequency, first harmonic, and second harmonic of the FM envelope frequency, and their output is applied through switch SW–3 and SW–1A to audio frequency phase detector 18. Switch SW–3 is normally set to select the fundamental frequency from filter 38, but when higher resolution bearing indications are desired it can be switched to filters 40 or 42, thus applying the harmonics of the azimuth signal to phase detector 18.

The frequency variations of the interfering FM input signal, and any incoherent FM noise on the selected FM input signal, are passed through AM detector 36 as frequency variations which are removed by filters 38, 40, and 42. Since this separation process is based on coherence rather than frequency or magnitude, it is effective to separate signals that are very close together in frequency or to recognize a weak signal in the presence of a stronger interfering signal.

From the foregoing description it will be apparent that this invention provides a Doppler effect radio direction finder receiver having improved sensitivity, accuracy and selectivity. It will also be apparent that this invention provides a novel coherent FM detector having a higher selectivity than heretofore known in the art. And it should be understood that this invention is by no means limited to the specific structure disclosed herein by way of example. Many modifications can be made in the structure disclosed without departing from the basic principles of this invention, and this invention includes all modifications falling within the scope of the following claims.

I claim:

1. In a Doppler FM radio direction finder receiver the improvement comprising means for generating a constant amplitude signal, means for locking said constant amplitude signal in phase quadrature to the center frequency of a selected FM signal, means for mixing said constant amplitude signal with all of the FM signals within the in put band-width of said receiver, and means for detecting amplitude variations in the mixture of signals.

2. A Doppler FM radio direction finder receiver, comprising an RF and IF amplifier section adapted to receive and to amplify FM input signals within a pre-selected input band-width, said amplifier comprising means for producing IF output signals corresponding to said FM input signals, means for generating a constant amplitude synthetic carrier signal, means for locking said carrier signal in phase quadrature to the center frequency of a selected one of said IF output signals, means for mixing said synthetic carrier signal with all of said IF signals, and means for detecting amplitude variations in the mixture of signals.

3. The combination defined in claim 2, wherein said means for generating said synthetic carrier signal comprises a loop circuit including a phase detector coupled to the output of said IF amplifier section, an oscillator coupled to said phase detector, a low pass filter coupled to the phase detector, a reactance transducer coupled between said filter and the resonant circuit of said oscillator, and means for initially turning said oscillator to the center frequency of said selected one of said IF signals.

4. The combination defined in claim 3, wherein said phase detector is operable to produce a phase-difference between the output of said oscillator and said selected IF signal, and wherein said phase difference signal is fed back to said oscillator through a feedback loop comprising said filter and said reactance transducer, and wherein the time constant of said feedback loop is long with respect to the modulation frequency of said IF signals.

5. The combination defined in claim 4, wherein said means for initially tuning said oscillator comprises a manual frequency control associated with said oscillator, a switch in series with said feedback loop, and an audio frequency null indicator coupled to said phase difference signal.

6. The combination defined in claim 5, wherein said means for mixing said synthetic carrier signal with all of said IF signals comprises a quadrature grid detector tube, said IF signals being applied to the control grid thereof, and said synthetic carrier signal being applied to the suppressor grid thereof.

7. The combination defined in claim 6, and also including a filter in the plate circuit of said detector tube, said filter being adapted to pass the modulation frequencies of said selected IF signal.

8. A Doppler FM radio direction finder system comprising a rotating antenna structure operable to induce frequency variations in incoming RF signals received by the antenna structure, a motor operable to rotate said rotating antenna structure, a reference signal generator coupled to said motor, an RF and IF amplifier circuit coupled to the antenna structure, said amplifier circuit being operable to produce IF output signals corresponding to said incoming RF signals, means for generating a synthetic carrier signal, means for locking said synthetic carrier signal in phase quadrature to the center frequency of a selected one of said IF output signals, means for mixing said synthetic carrier signal with all of said IF output signals, an amplitude modulation detector operable to detect amplitude variations in said mixture of signals, and a phase detector coupled between said amplitude modulation detector and said reference signal generator.

9. The combination defined in claim 8, wherein said means for generating said synthetic carrier signal comprises a phase detector coupled to said IF signals, an oscillator coupled to said phase detector, a filter coupled to said phase detector, a reactance transducer coupled between said filter and the resonant circuit of said oscillator, and means for initially tuning said oscillator to the center frequency of a selected one of said IF signals.

10. The combination defined in claim 9, wherein said phase detector is operable to produce a phase-difference signal which is proportional to the cosine of the phase difference between its two input signals, and wherein said phase difference signal is fed back to said oscillator through a feed-back loop comprising said filter and said reactance transducer, and wherein the time constant of said feed-back loop is long with respect to the modulation frequency of said IF signals.

11. The combination defined in claim 10, wherein said means for initially tuning said oscillator comprises a manual frequency control associated with said oscillator, a switch in series with said feed-back loop, and an audio frequency null indicator coupled to said phase difference signal.

12. The combination defined in claim 11, wherein said means for mixing said synthetic carrier signal with all of said IF signals comprises a quadrature grid detector tube, said IF signals being coupled to the control grid thereof, and said synthetic carrier signal being coupled to the suppressor grid thereof.

References Cited in the file of this patent

UNITED STATES PATENTS

| | | |
|---|---|---|
| 2,414,798 | Budenbom | Jan. 28, 1947 |
| 3,007,163 | De Rosa et al. | Oct. 31, 1961 |
| 3,025,522 | Steiner | Mar. 13, 1962 |